United States Patent
Cuervo

(10) Patent No.: US 8,305,922 B2
(45) Date of Patent: Nov. 6, 2012

(54) METHOD FOR PCRF TO AUTONOMOUSLY RESPOND TO CELL CAPACITY SHORTAGE

(75) Inventor: Fernando Cuervo, Dunrobin (CA)

(73) Assignee: Alcatel Lucent, Paris (FR)

( * ) Notice: Subject to any disclaimer, the term of this patent is extended or adjusted under 35 U.S.C. 154(b) by 319 days.

(21) Appl. No.: 12/708,314

(22) Filed: Feb. 18, 2010

(65) Prior Publication Data

US 2011/0199903 A1    Aug. 18, 2011

(51) Int. Cl.
*H04Q 7/00*    (2006.01)
(52) U.S. Cl. ......... 370/252; 370/328; 370/468; 455/450
(58) Field of Classification Search .......... 370/229–235, 370/252, 253, 328–338, 468; 455/450–453; 709/223–226
See application file for complete search history.

(56) References Cited

U.S. PATENT DOCUMENTS

2011/0208853 A1* 8/2011 Castro-Castro et al. ...... 709/223

FOREIGN PATENT DOCUMENTS

WO    2005017707    2/2005

OTHER PUBLICATIONS

3rd Generation Partnership Project; Technical Specification Group Core Network and Terminals; Policy and Charging Control over Rx reference point (Release 9)', Generation Partnership Project (3GPP) TS 29 Mobile Competence Centre; 650, Route Des Lucioles; F-06921 Sophis-Antipolis Cedex; France No. V9.2.0, Dec. 18, 2009, pp. 1-44.
3rd Generation Partnership Project; Technical Specification Group Core Network and Terminals; Policy and Charging Control signalling flows and QoS parameter mapping; (Release 9) 3GPP Standard; 3Gpp TS 29.213, 3rd Generation Partnership Project (3Gpp), Mobile Competence Centre; 650 Route Des Lucioles; F-06921 Sophis-Antipolis Cedex; France, No. V9.1.0, Dec. 12, 2009, pp. 1-127.
Lucent Technologies: "General Principles of QoS Control Policies for UMTS", 3GPP Draft; S2-000144, 3rd Generation, Partnership Project (3GPP), Mobile Competence Centre; 650, Route Des Lucioles; F-06921 Sophia-Antipolis Cedex; France, vol. SA WG2, No. Puerto Vallarta, Mexico; 20000204, (Feb. 4, 2000).
"Telecommunications and Internet converged Services and Protocols for Advanced Networking (TISPAN); Requirements for QoS in a NGN; ETSI TS 181 018" ETSI Standards, LIS, Sophis Antipolis Cedex, France, vol. TISPAN, No. V.0.0, Aug. 1, 2007.
International Search Report for PCT/IB2011/000629 dated Aug. 18, 2011.

* cited by examiner

*Primary Examiner* — Pao Sinkantarakorn
(74) *Attorney, Agent, or Firm* — Kramer & Amado P.C.

(57) ABSTRACT

Various exemplary embodiments relate to a method and related network node and machine-readable storage medium including one or more of the following: determining network status; receiving an application request at the PCRN; generating a new PCC rule in response to the application request and network status; and providing the new PCC rule to a PCEN. Various exemplary embodiments further include receiving an event message, determining the network status from received event messages and isolating congestion using previously issued PCC rules and a network topology.

20 Claims, 4 Drawing Sheets

METHOD FOR PCRF TO AUTONOMOUSLY RESPOND TO CELL CAPACITY SHORTAGE

TECHNICAL FIELD

Various exemplary embodiments disclosed herein relate generally to policy and charging in telecommunications networks.

BACKGROUND

As the demand increases for varying types of applications within mobile telecommunications networks, service providers must constantly upgrade their systems in order to reliably provide this expanded demand. What was once a system designed simply for voice communication has grown into an all-purpose network, providing access to a myriad of applications that include combinations of text messaging, multimedia streaming, and general Internet access. As seen in second and third generation networks, voice services must be carried over dedicated voice channels and directed toward a circuit-switched core, while other services are transmitted via the Internet Protocol (IP) and directed to a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it calls Long Term Evolution (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for the QoS resources for their particular network activity.

The 3GPP describes the components of the EPC and their interactions with each other in a number of technical specifications. Specifically, 3GPP TS 29.212, 3GPP TS 29.213, and 3GPP TS 29.214, which are incorporated herein by reference, describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

For example, 3GPP TS 29.212 provides guidance on the role of the PCRF in issuing policy and control charging (PCC) rules to the PCEF and Quality of Service (QoS) rules to the BBERF. 3GPP TS 29.212 specifies that the PCRF shall provide PCC and QoS rules in response to requests from the PCEF, the BBERF, or an Application Function (AF). The PCRF can use these rules to provision network resources in accordance with operator defined network policy. 3GPP TS 29.212 further specifies the format of requests and the provisioning of rules to the PCEF and BBERF. 3GPP TS 29.212 also specifies that there may be errors which prevent the PCEF or BBERF from successfully implementing rules provisioned by the PCRF. It specifies how the PCEF or BBERF should report these errors. 3GPP TS 29.212 also specifies the format for reporting other events such as termination of IP-CAN sessions and bearers.

The specifications describe several problems that may occur after the PCRF issues new rules. For example, the installation or activation of a new rule may fail because of a resource limitation or failure to allocate resources. Additionally, implementing new rules may cause the PCEF or BBERF to drop previous connections to free up resources for a higher priority connection, this is referred to as pre-emption. These types of errors result in a failure to provide service and subscriber frustration.

In view of the foregoing, it would be desirable to provide a more robust method of allocating resources. In particular, it would be desirable to provide a method for allocating resources while reducing the number of failures in installing or activating the rules and the number of dropped connections.

SUMMARY

In light of the present need for a method of allocating network resources that reduces failures and dropped connections, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a Policy and Charging Rules Node (PCRN) for responding to a service request based on a status of a subscriber network, the method comprising: receiving at the PCRN a service request for resources controlled by the PCRN; determining the status of the subscriber network; determining from the status of the subscriber network whether the service request should be fulfilled as requested; if the service request should be fulfilled as requested, generating a new policy and charging control (PCC) rule to fulfill the service request; and if the service request should not be fulfilled as requested, modifying the service request and generating a new PCC rule to fulfill the modified service request or negotiation.

It should be apparent that, in this manner, various exemplary embodiments enable the allocation of network resources in response to the status of the subscriber network. In particular, by recording and analyzing data related to network events, a policy and rules charging node may determine the status of the network and issue new rules in response to the status of the network.

BRIEF DESCRIPTION OF THE DRAWINGS

In order to better understand various exemplary embodiments, reference is made to the accompanying drawings, wherein.

DETAILED DESCRIPTION

Figure 1:
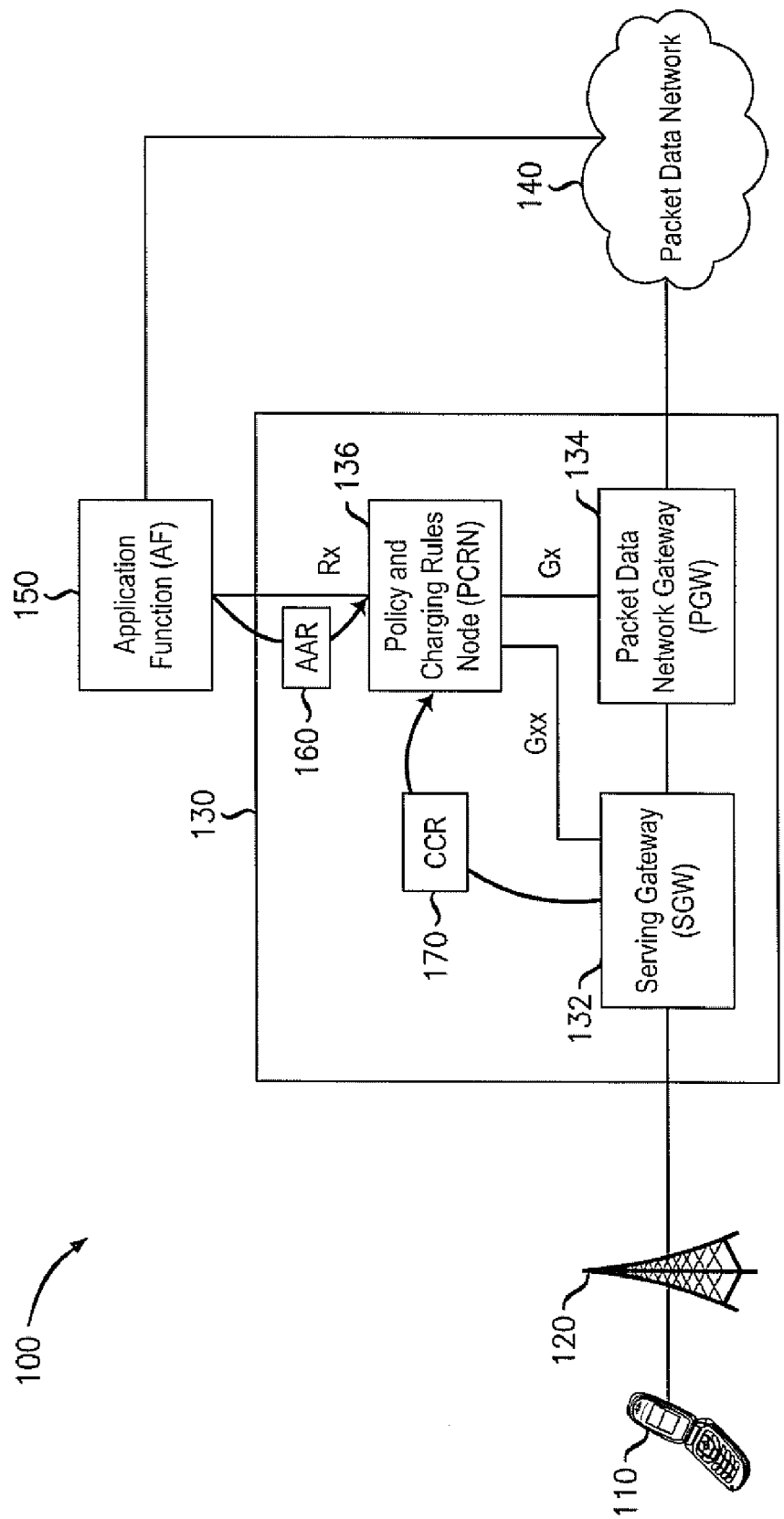
FIG. 1 illustrates an exemplary subscriber network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be telecommunications network or other network for providing access to various services. Exemplary network may include user equipment 110, access network 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, smart phone, television set-top box, or any other device capable of communicating with other devices via IP over the EPC 130.

Access network 120 may be a device or network of devices that enables communication between user equipment 110 and EPC 130. For example, access network 120 may be a base transceiver station such as an evolved nodeB (eNodeB) as defined by 3GPP standards. Thus, access network 120 may be a device that communicates with user equipment 110 via a first medium, such as radio waves, and communicates with EPC 130 via a second medium, such as Ethernet cable. Access network 120 may be in direct communication with EPC 130 or may communicate via a number of intermediate nodes (not shown). In various embodiments, access network may include multiple base transceiver stations (not shown) to provide mobility to user equipment 110. Note that in various alternative embodiments, user equipment 110 may communicate directly with evolved packet core 130. In such embodiments, access network 120 may not be present.

Evolved packet core (EPC) 130 may be a device or network of devices that provides user equipment 110 with gateway access to packet data network 140. EPC 130 may further charge a subscriber for use of provided data services and ensure that particular quality of service (QoS) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, and a policy and charging rules node (PCRN).

Serving gateway (SGW) 132 may be a device that supports data paths between the access network 120 and PGW 134. The data paths may contain virtual containers called bearers with unique Quality of Service (QoS) characteristics. The bearers may contain virtual connections called service data flows (SDFs). In various embodiments where user equipment 110 is a mobile device and access network 120 is an eNodeB, SGW 132 may be responsible for establishing new bearers when the mobile device changes eNodeB.

The SGW 132 may implement a bearer binding and event reporting function (BBERF) according to the 3GPP TS 29.212, 29.213, and 29.214 standards. The SGW 132 may also provide event messages to the PCRN 136 using the Gxx interface and credit control request (CCR) message 170. SGW 132 may generate event messages to inform the PCRN 136 whenever there is any change in a bearer such as, for example, failure to allocate a bearer, termination of a bearer, preemption of a bearer or any other event trigger. SGW 132 may also request new QoS rules from the PCRN 136 by sending a CCR message via the Gxx interface.

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Thus, PGW 134 may be a policy and charging enforcement node (PCEN). The PGW 134 may also provide event messages to the PCRN using the Gx interface and credit control response (CCR) message (not shown). PGW 134 may request new PCC rules from PCRN 136 by sending a CCR message via the Gx interface. PGW 134 may also include a number of additional features such as, for example, packet filtering, deep packet inspection, and subscriber charging support.

Policy and charging rules node (PCRN) 136 may be a device that receives requests for application services, generates PCC rules, and provides PCC rules to the PGW 134 and/or other PCENs (not shown). In various embodiments, PCRN 136 may also provide QoS rules to the SGW. PCRN 136 may be in communication with AF 150 via an Rx interface.

PCRN 136 may also be in communication with SGW 132 and PGW 134 via a Gxx and a Gx interface, respectively. Upon creating a new PCC rule or upon request by the PGW 134, PCRN 136 may provide a PCC rule to PGW 134 via the Gx interface. In various embodiments, such as those implementing the Proxy Mobile IP (PMIP) standard for example, PCRN 136 may also generate QoS rules. Upon creating a new QoS rule or upon request by the SGW 132, PCRN 136 may provide a QoS rule to SGW 132 via the Gxx interface.

Packet data network 140 may be any network for providing data communications between user equipment 110 and other devices connected to packet data network 140, such as AF 150. Further, Packet data network 140 may provide, for example, phone and/or Internet service to various user devices in communication with packet data network 140.

Application function (AF) 150 may be a device that provides an application service to user equipment 110. Thus, AF 150 may be a server or other device that provides, for example, streaming video service to user equipment 110. AF 150 may further be in communication with the PCRN 136 of the EPC 130 via an Rx interface. When AF 150 is to begin providing application service to user equipment 110, AF 150 may generate an application request message, such as an AA-Request (AAR) 160 according to the Diameter protocol and/or 3GPP TS 29.214, to notify the PCRN 136 that resources should be allocated for the application service. Such application request message may include information such as an identification of the subscriber or its IP address using the application service and an identification of the particular service data flows that must be established in order to provide the requested service. AF 150 may communicate such an application request to the PCRN via the Rx interface.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 2-5.

According to various exemplary embodiments, PCRN 136 may receive requests to allocate resources from AF 150, SGW 132 or PGW 134. PCRN 136 may allocate resources by generating appropriate PCC and QoS rules and send them to PGW 134 and SGW 132. Once PCC and QoS rules are installed in the PGW 134 and SGW 132 respectively, these components may be responsible for monitoring network connections. When an event occurs which affects bearer state the PGW 134 or SGW 132 may report the event to the PCRN 136 using a message such as, for example, CCR 170. For example, if the SGW 132 detects an error in installing a new QoS rule or allocating a new bearer, SGW 132 may send CCR 170 to the PCRN 136 providing details of the event. It should be noted that other types of messages may be used to report events in various circumstances. Events may not be limited to errors and may include any event for which PCRN 136 provisioned an event trigger to SGW 132 or PGW 134 and events which do not require any event trigger. PCRN 136 may process the information provided in event messages along with other information to determine the status of the subscriber network. The PCRN 136 may then take the network status into account when making policy decisions. For example, if the PCRN 136 determines that a requested network resource is scarce (i.e., there is a high likelihood of being unavailable), it may deny a new resource request. The PCRN 136 may also negotiate with the AF 150 based on the network status. For example, if the PCRN 136 determines that an application request with a low QoS is likely to be dropped or if assigned it would perform poorly (for non-guaranteed bearers), it may inform the AF 150 that a higher QoS is required. If the higher QoS is acceptable, AF 150 may then send a new application request. As another example, if PCRN 136 determines that an application request with a high QoS is likely to pre-empt existing services, it may inform the AF 150 that a lower QoS is available at a lower charging rate. If the lower QoS is acceptable, AF 150 may send a new application request.

Figure 2:
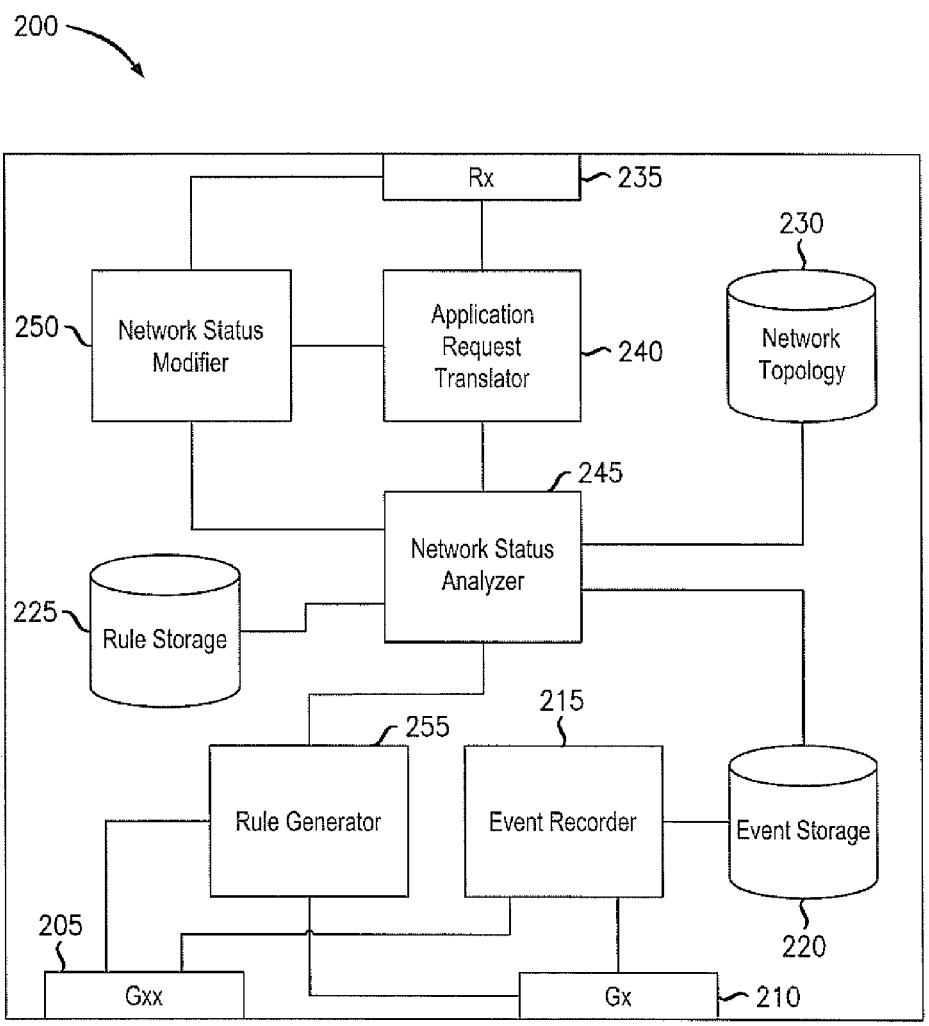
FIG. 2 illustrates an exemplary policy and charging rules node (PCRN) for creating new policy and charging control (PCC) and quality of service (QoS) rules at least partially based on network status.

FIG. 2 illustrates an exemplary policy and charging rules node (PCRN) 200 for creating new policy and charging control (PCC) and quality of service (QoS) rules at least partially based on network status. PCRN 200 may correspond to PCRN 136 of exemplary subscriber network 100. PCRN 200 may include Gxx interface 205, Gx interface 210, Event Recorder 215, Event Storage 220, Rule Storage 225, Network Topology 230, Rx interface 235, Application Request Translator 240, Network Status Analyzer 245, Network Status Modifier 250, and Rule Generator 255.

Gxx interface 205 may be an interface comprising hardware and/or executable instructions encoded on a machine-readable storage medium configured to communicate with an SGW such as SGW 132. Such communication may be implemented according to the 3GPP TS 29.212. Specifically, Gxx interface 205 may receive event messages and application requests from SGW 132 and send QoS rules to SGW 132 using Gxx interface 205.

Gx interface 210 may be an interface comprising hardware and/or executable instructions encoded on a machine-readable storage medium configured to communicate with a PGW such as PGW 134. Such communication may be implemented according to the 3GPP TS 29.212. Specifically, Gx interface 210 may receive event messages and application requests from PGW 134 and send PCC rules to PGW 134 using Gx interface 210.

Event Recorder 215 may include hardware and/or executable instructions on a machine-readable storage medium configured to process incoming event messages and record data in Event Storage 230. Event Recorder 215 may receive event messages over Gx interface 210 and/or Gxx interface 205. Next, Event Recorder 215 may extract event data from the event message. Event Recorder 215 may then add additional information such as an event ID and time to the event data. The Event Recorder 215 may then pass the event data to Event Storage 220 for recording.

Event Storage 220 may be any machine-readable medium capable of storing event data generated by the Event Recorder 215. Accordingly, Event Storage 220 may include a machine-readable storage medium such as read-only memory (ROM), random-access memory (RAM), magnetic disk storage media, optical storage media, flash-memory devices, and/or similar storage media. As will be described in further detail below with respect to FIG. 4, Event Storage 220 may store data regarding numerous types of events reported to PCRN 200. Such data may include, for example, type of event, affected PCC rule, affected data flows, QCI of affected flows, allocation retention priority (ARP) of affected flows, subscriber identification, eNodeB, serving gateway and time of event. Rule Storage 225 may be any machine-readable medium capable of storing PCC rules generated by Rule Generator 255. Accordingly, Rule Storage 225 may include a machine-readable storage medium such as read-only memory (ROM), random-access memory (RAM), magnetic disk storage media, optical storage media, flash-memory devices, and/or similar storage media. Rule Storage 225 may store definitions of numerous PCC rules created by Rule Generator 255. Such definitions may include, for example, rule names, service data flow filters, QoS parameters, and charging parameters. Rules Storage 225 may use any manner known in the art to store PCC rules and update rule data.

Network Topology 230 may be any machine-readable medium capable of storing data representing the components of subscriber network 100. Accordingly, Network Topology 230 may include a machine-readable storage medium such as read-only memory (ROM), random-access memory (RAM), magnetic disk storage media, optical storage media, flash-memory devices, and/or similar storage media. Network Topology 230 may be built dynamically or by using information provisioned from a management system or by any other method known in the art.

Rx interface 235 may be an interface comprising hardware and/or executable instructions encoded on a machine-readable storage medium configured to communicate with an AF such as AF 150. Such communication may be implemented according to the 3GPP TS 29.214. Specifically, Rx interface 235 may receive an application request from AF 150 and respond to an application request via the Rx interface.

Application Request Translator 240 may include hardware and/or executable instructions on a machine-readable storage medium configured to determine from an application request received via Gxx interface 205, Gxx interface 210 or Rx interface 235 what service data flows will be necessary to provide the requested service. Application Request Translator 240 may then generate a service request object to represent the requested service data flows. Application Request Translator 240 may then pass the service request object to Network Status Analyzer 245 for further processing.

Network Status Analyzer 245 may include hardware and/ or executable instructions on a machine-readable storage medium configured to determine whether PCRN 200 should fulfill a service request based on the status of the required network resources. Network Status Analyzer 245 may use data stored in Event Storage 220, Rule Storage 225 and/or Network Topology 230 to determine the status of the subscriber network. Using this data, the Network Status Analyzer 245 may determine that a requested resource is congested or that a requested QoS Class Identifier (QCI) is likely to be preempted; therefore, the service request should not be fulfilled. If Network Status Analyzer 245 determines that PCRN 200 should not fulfill a service request, it may pass the failed service request to Network Status Modifier 250 for further processing. If Network Status Analyzer 245 determines that PCRN 200 should fulfill a service request, it may pass the service request to Rule Generator 255 for further processing.

Network Status Modifier 250 may include hardware and/or executable instructions on a machine-readable storage medium configured to receive a denied service request from Network Status Analyzer 245 and negotiate with AF 150 over Rx interface 235 for an updated application request. Network Status Modifier 250 may consider the requested service flows and the reason the service request was denied in order to determine whether an upgrade or downgrade may be applicable according to provider encoded rules in the PCRN. Network Status Modifier 250 may then determine an acceptable service request. Network Status Modifier 250 may then propose the acceptable service request to AF 150 over Rx interface 205 using an AA-Answer (AAA) message (not shown). In various embodiments, Network Status Modifier 250 may also negotiate with SGW 132 or PGW 134 if the application request comes in the form of a CCR request. In this scenario, Network Status Modifier 250 may propose the acceptable service request to SGW 132 or PGW 134 via the Gxx interface 205 or Gx interface 210, respectively, using a CC-Answer (CCA) message (not shown).

Rule Generator 255 may include hardware and/or executable instructions on a machine-readable storage medium configured to generate new PCC and/or QoS rules based on a received service request. Rule Generator 255 may generate PCC and/or QoS rules according to any method known to those of skill in the art.

Figures 3, 4:
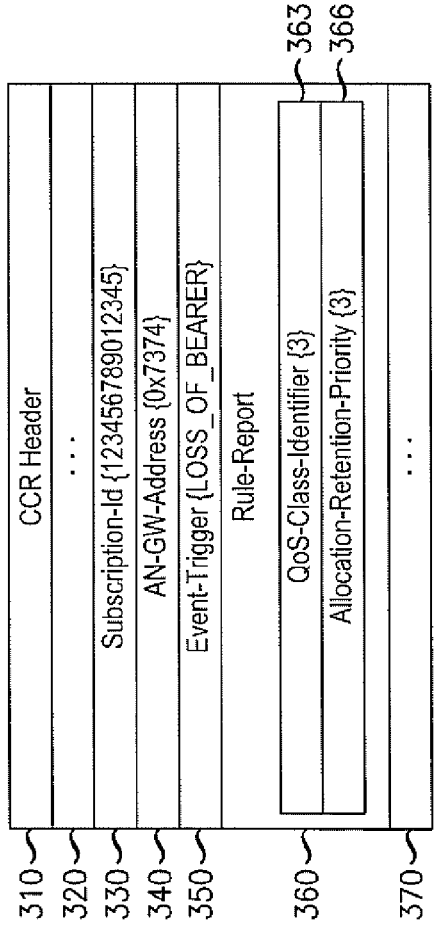
FIG. 3 illustrates an exemplary event message.
FIG. 4 illustrates an exemplary data structure for storing event data.

FIG. 3 illustrates an exemplary event message 300. Event message 300 may be a CCR message constructed according to the Diameter message protocol and/or 3GPP TS 29.212. Accordingly, event message 300 may include a header 310, subscription ID field 330, AN-GW-Address field 340, Event-Trigger field 350, Rule-Report field 360 and a number of additional fields 320, 370. Note that the order of the fields of CCR 300 may vary. Thus, for example, subscription ID field 330 may be located after AN-GW-Address field 340 or Rule-Report Field 360.

Header 310 may be a standard Diameter header indicating that message 300 is a CCR. Thus, header 310 may include a command code field set to a value of 272 and the R-bit field of the command flags field set, as provided for by the Diameter protocol and 3GPP TS 29.212.

Subscription ID field 330 may be an attribute-value pair (AVP) for indicating the subscriber that is associated with a particular event message. For example, subscription ID field 330 indicates that the subscription identified as "123456789012345" is associated with CCR 300. This information may be used to identify the particular phone or user affected by the event.

AN-GW-Address field 340 may be an AVP for indicating the SGW that is associated with a particular event message. AN-GW-Address field 340 may store an IPv4, IPv6 address, or any other identifier known in the art of identifying a network device. For example, AN-GW-Address field 340 indicates that the SGW identified as "0x7374" is associated with the event.

Event-Trigger field 350 may be an AVP for indicating the type of event which caused the event message. For example, Event-Trigger field 350 indicates that the event is a loss of bearer, as indicated by the LOSS_OF_BEARER enumerated value. The type of event may also determine, at least in part, which additional fields 320, 370 are included in the event message.

Rule-Report field 360 may be an AVP for indicating any changes in QoS or PCC rules. Rule-Report field 360 may include QoS information related to the event. This may include the QoS Class Identifier (QCI) 363, maximum upload and download bandwidth (not shown), guaranteed upload and download bitrates (not shown), bearer identifier (not shown) and allocation retention priority (ARP) 366.

Additional fields 320, 370 may include additional information as specified by the Diameter protocol and/or any 3GPP standard. Thus, additional fields 320, 360 may include additional AVPs such as, for example, the Origin-Host AVP, Destination-Host AVP, Supported-Features AVP, Framed-IP-Address AVP, etc. Event Recorder 215 may use additional fields 320, 260 for extracting other useful information such as, for example, flow identifying information. The person of ordinary skill in the art will recognize that relevant event data may vary greatly, affecting the content of event message 300.

FIG. 4 illustrates an exemplary data arrangement 400 for storing event data. Data arrangement 400 may be, for example, a table in a database stored in Event Storage 225. Alternatively, data arrangement 400 could be a series of linked lists, an array, or a similar data structure. Thus, it should be apparent that data arrangement 400 is an abstraction of the underlying data; any data structure suitable for storage of this data may be used.

Data arrangement 400 may include an Event ID field 405, a Time field 410, a Subscriber ID field 415, an eNodeB ID 420, an SGW ID field 425, an Event Trigger field 430, a QCI field 435, an ARP field 440 and a PCC rule field 445. Data arrangement 400 may include additional fields (not shown) required or useful in defining event data. Data arrangement 400 may include multiple entries such as, for example, entries 450, 455 and 460.

Event ID field 405 may be used to uniquely identify each event. Time field 410 may be used to indicate the time of the event. Any method known in the art such as, for example, NTP may be used to indicate the time of the event. Subscriber ID field 415 may be used to identify the subscriber or user device affected by the event. SGW ID field 420 may be used to indicate the SGW that reported the event. In various embodiments, the 3GPP-USER-LOCATION-INFO AVP may also be used to provide a finer location. Event Trigger field 425 may be used to store the type of event. QCI field 420 may be used to store the QCI of the data flow associated with the event. ARP field 435 may be used to store the ARP of the data flow associated with the event. eNodeB ID field 440 may be used to indicate the eNodeB that was servicing the subscriber at the time of the event. PCC rule field 445 may indicate a PCC rule to which the event relates.

As an example, record 450 indicates that the event represented by Event ID "36" occurred at time "1111111112". This event affected a service flow which was being used by a subscriber identified by subscriber ID "234567890123456" and was using an eNodeB identified by eNodeB ID "0x5FCC" and an SGW identified by SGW ID "0xB832". The event is of type "LOSS_OF_BEARER" indicating that a bearer was dropped. At the time of the event, the service flow had a QCI of 2 and an ARP of 5. The event affected a PCC rule identified by "0x3B72".

As another example, record 455 indicates that the event represented by Event ID "40" occurred at time "1111111114." This event affected a service flow which was being used by a subscriber identified by subscriber ID "345678901234567" and was using an eNodeB identified by eNodeB ID "0x6031" and a SGW identified by SGW ID "0xB832". The event is of type "LOSS_OF_BEARER" indicated that a bearer was dropped. At the time of the event, the service flow had a QCI of 3 and an ARP of 3. The event affected a PCC rule identified by "0x82A3"

Figure 5:
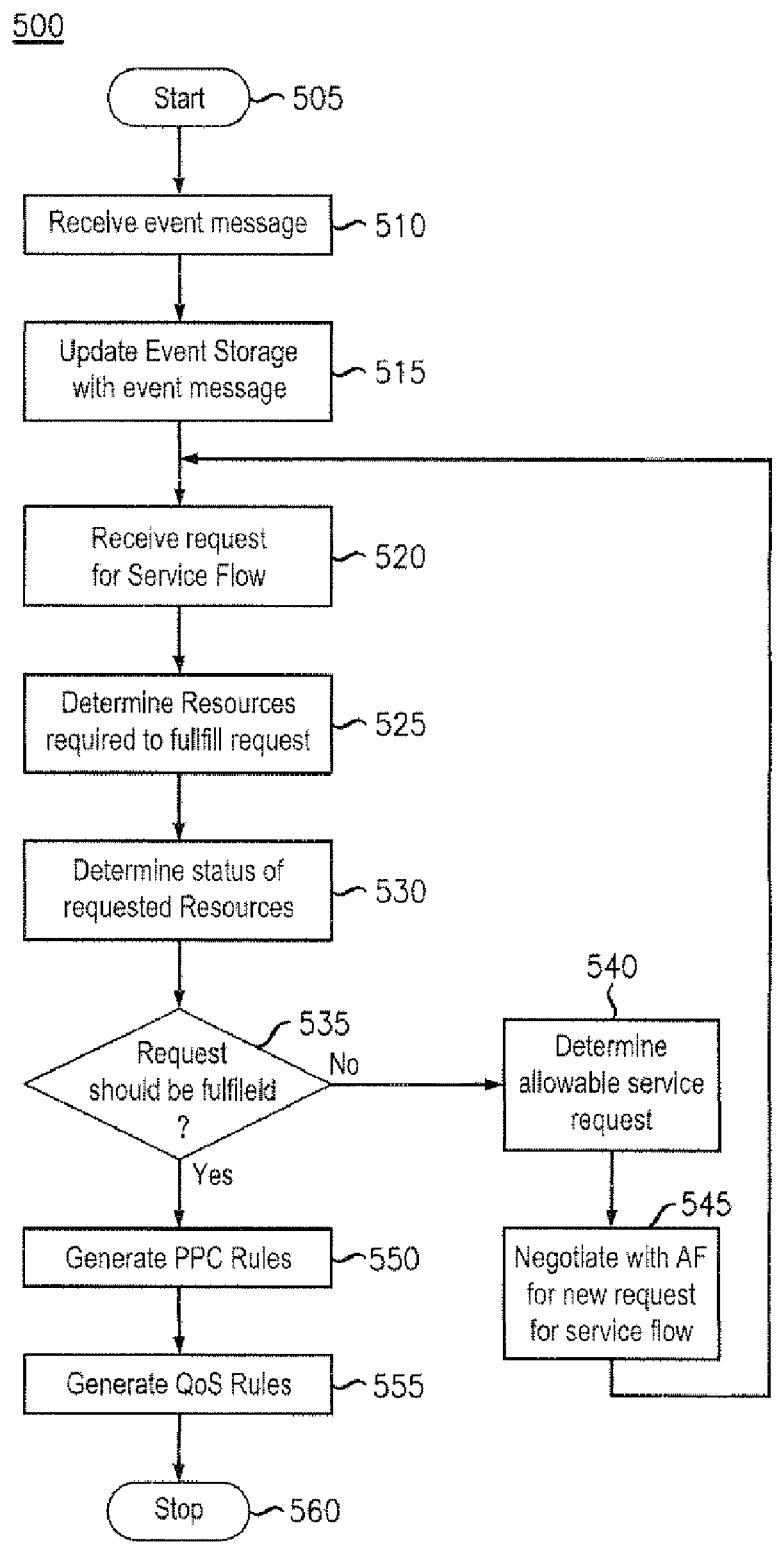
FIG. 5 illustrates an exemplary method for creating new policy and charging control (PCC) and quality of service (QoS) rules at least partially based on the status of subscriber network.

FIG. 5 illustrates an exemplary method 500 for creating new policy and charging control (PCC) rules at least partially based on the status of subscriber network 100. Method 500 may be performed by the components of PCRN 136 and/or PCRN 200 to establish PCC rules for service data flows in response to the status of the subscriber network.

Method 500 may begin at step 505 and proceed to step 510 where PCRN 200 receives an event message over Gxx interface 205 or Gx interface 210. Method 500 may then proceed to step 515 where Event Recorder 215 may process the event message by extracting event information. Event Recorder 215 may then add information such as an Event ID and the time of the message. Event Recorder may then enter the event information into Event Storage 220.

Method 500 may then proceed to step 520 where PCRN receives an application request from an AF via the Rx interface 205. Method 500 may then proceed to step 525 where Application Request Translator 240 may translate the request into a service request object containing service flow objects.

Then, at step 525, the Network Status Analyzer 245 may determine the network resources required to fulfill the service request. This step may require the Network Status Analyzer 245 to access the Network Topology to determine which network resources would be used to create each service flow of the service request. Method 500 may then proceed to step 525 where the Network Status Analyzer 245 may determine the status of the requested resource. Network Status Analyzer 245 may analyze the status of the requested resources by using the data in Event Storage 220, Rule Storage 225, and/or Network Topology 230. Network Status Analyzer 245 may search the Event Storage 220 for event data relating to a required network resource. If the Event Storage 220 indicates a statistical trend in the event data related to a particular resource, the Network Status Analyzer 245 may determine that the network resources are congested, unavailable, or otherwise not suited to provide the requested services. For example, if the Network Status Analyzer 245 finds a commonality such as multiple events with the same SGW ID field 420 and the Event Trigger Field 425 indicates a LOSS_OF_BEARER, the Network Status Analyzer may be able to determine that the indicated SGW or more specifically, a subtending eNodeB is congested. The Network Status Analyzer 245 may also cross-reference the event data with rule data in Rules Storage 225 when searching for statistical trends using PCC rule field 445. The Network Status Analyzer 245 may use the Network Topology 230 to isolate congestion if more than one network resource appears congested. It should be appreciated that this is only one example of a statistical trend. The person of ordinary skill of the art will recognize that many possible statistical trends among the data in Event Storage 220, Rule Storage 225, and Network Topology 230 may indicate the status of the subscriber network.

Method 500 may then proceed to step 535 where the Network Status Analyzer 245 may determine whether the service request should be fulfilled. The Network Status Analyzer 245 may consider the status of the subscriber network as well as internal policy controls. If the service request should not be fulfilled because of the network status, method 500 may proceed to step 540. If the service request should be fulfilled, method 500 may proceed to step 550.

In step 540, Network Status Modifier 250 may determine an allowable service request. For example, Network Status Modifier 250 may require a higher ARP if the Network Status Analyzer 245 determines that required resources are congested and likely to drop low priority service flows. Method 500 may then proceed to step 545 where the Network Status Modifier 250 responds to the application request of the AF 150. Network Status Modifier 250 may use an AA Answer (AAA) command to indicate that the previous request will not be fulfilled and to propose an allowable application request. If the AF 150 accepts the proposed application request, it may modify and transmit the application request. Then, method 500 will return to step 520.

In step 550, the Rule Generator 255 may generate PCC rules to implement the service request. The Rule Generator 255 may combine information provided in the application request with internal policy decisions to create PCC rules. Rule Generator 255 may then transmit the new PCC rules to PGW 134 via the Gx interface 210. The PCRN may also add the PCC rule to Rules Storage 225 at this point.

At step 555, Rule Generator 255 may generate QoS rules from the PCC rules by extracting the QoS portion. Rule Generator 255 may then transmit the QoS rules to SGW via the Gxx interface and method 500 may end in step 560.

Having described exemplary components and methods for the operation of exemplary subscriber network 100 and PCRN 200, an example of the operation of exemplary network 100 and PCRN 200 will now be provided with reference to FIGS. 1-5. PCRN 136 may correspond to PCRN 200. The contents of Event Storage 220 may be indicated by data arrangement 400. CCR 170 may be described in detail by CCR 300.

The process may begin when PCRN 136, 200 receives CCR 170, 300 from SGW 132. Event Recorder 215 may then process the fields of CCR 170 to extract event data. Event Recorder 215 would extract a Subscriber ID of "0xA9B6" from the Subscriber-ID AVP 330, a SGW ID of "0x7374" from AN-GW-Address 340, an Event Trigger of "LOSS_OF_BEARER" from Event-Trigger AVP 350, a QCI of 3 from QoS-Class-Identifier AVP 363 and an ARP of 3 from Allocation-Retention-Priority AVP 366. Event Recorder 215 may provide other event data such as an Event ID of 0x43BA and a Time of 43. Event Recorder 215 may then create a new event data record in Event Storage 220.

Rx interface 205 may then receive an AAR 160 containing an application request from AF 150. Application Request Translator 240 may then translate the application request into a service request containing one or more service flows. Network Status Analyzer 245 may then determine that the service request requires several resources including SGW 0xB832. Network Status Analyzer may then search Event Storage 220 and Rules Storage 225 for data records containing SGW 0xB832. From the data in data arrangement 400, Network Status Analyzer may determine that SGW 0xB832 is experiencing congestion for a particular resource class because it contains multiple events indicating a loss of bearer (correlated to the resource class) for that SGW within a short time period.

In step 530, the Network Status Analyzer may determine that the service request should not be fulfilled because, for instance, the ARP is low and the SGW is likely drop the bearer quickly. Therefore, the method will proceed to step 535 where the Network Status Modifier 250 may determine an allowable application request. Network Status Modifier may determine that a higher ARP will prevent dropping the bearer. Network Status Modifier, in step 540, may then send to AF 150, via Rx interface 205, an AAA indicating that an application request with a higher QoS will be allowable. If AF 150 agrees to raise the requested QoS, the AF may send another application request. A QoS upgrade or downgrade may involve changes to QCI, ARP or Bandwidth.

The method will proceed as before from step 515 until step 530, where the Network Status Analyzer may determine that it should allow the service request. In step 545, the Rule Generator may then generate a PCC rule from the service request and internal policy decisions. The new PCC rule may be stored in Rule Storage 225. In step 560, the Rule Generator may transmit the new PCC rule to PGW 134 via Gx interface 210. If Gateway Control Sessions exist, the Rule Generator may generate a QoS Rule from the PCC rule and transmit the QoS rule to SGW 132 via Gxx interface 205.

According to the foregoing, various exemplary embodiments provide for creation of PCC rules in response to the status of a subscriber network. In particular, by recording events related to previously implemented PCC and QoS rules, a policy and charging rules node may generate new rules which are responsive to the status of the subscriber network.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a Policy and Charging Rules Node (PCRN) for responding to a service request based at least in part on a status of a subscriber network, the method comprising:
   receiving at the PCRN at least one event message related to a transfer facilitated by the subscriber network;
   storing data regarding the at least one event message in an Event Storage;
   receiving at the PCRN a service request for resources controlled by the PCRN;
   determining the status of the subscriber network;
   determining from the status of the subscriber network whether the service request should be fulfilled as requested; and
   if the service request should be fulfilled as requested, generating at least one new policy and charging control (PCC) rule to fulfill the service request,
   wherein the step of determining the status of the subscriber network further comprises:
      identifying at least one statistical trend among a subset of the data in the Event Storage; and
      determining from the at least one statistical trend whether an element of the subscriber network is congested.

2. The method according to claim 1, wherein the method further comprises:
   if the service request should not be fulfilled as requested, determining an acceptable service request;
   negotiating with an Application Function over an Rx interface; and
   receiving a modified service request.

3. The method according to claim 1, wherein the PCRN comprises a Network Topology and the step of determining a status of a subscriber network further comprises:
   identifying an element of the subscriber network that is congested using the Network Topology.

4. The method according to claim 1, wherein the data regarding the at least one event message comprises:
   a name of a PCC rule;
   a time of the event;
   an indication of a type of the event; and
   an affected network component.

5. The method according to claim 4, wherein the indication of the type of the event comprises at least one of:
   a failure to allocate a bearer; and
   a loss of bearer due to priority preemption.

6. The method according to claim 1, wherein the step of determining the status of the subscriber network comprises:
   determining the status of the subscriber network based at least partially on PCC rules stored in a Rules Storage.

7. The method of claim 1, wherein an element of the subscriber network is congested and the service request should not be fulfilled as requested.

8. The method of claim 1, wherein all elements of the subscriber network necessary to fulfill the service request are not congested and the service request should be fulfilled as requested.

9. A policy and charging rules node (PCRN) for responding to a service request by generating at least one policy and charging control (PCC) rule based at least in part on a status of a subscriber network, the PCRN comprising:
   an interface that receives a service request for network resources controlled by the PCRN;
   an Event Storage that stores data related to received event messages related to a transfer facilitated by the subscriber network;
   a Rule Storage that stores data related to PCC rules generated by the PCRN;
   a Network Status Analyzer that determines the status of the subscriber network by identifying at least one statistical trend among a subset of the data in the Event Storage and the data in the Rule Storage and determining from the at least one statistical trend whether an element of the subscriber network is congested, and determines whether the service request should be fulfilled; and
   a Rule Generator that, when the service request should be fulfilled, creates at least one PCC rule based on the received service request.

10. The PCRN according to claim 9, wherein the Network Status Analyzer determines that an element of the subscriber network is congested and further comprising:
    a Network Topology that identifies the element of the subscriber network that is congested.

11. The PCRN according to claim 9, further comprising:
    a Network Status Modifier that determines an acceptable service request and negotiates a modified service request.

12. The PCRN according to claim 9, the interface comprising:
 a Gx interface that sends at least one PCC rule to a Policy and Control Enforcement Node (PCEN) and receives at least one event message from the PCEN.

13. The PCRN according to claim 9, the interface comprising:
 a Gxx interface that sends at least one Quality of Service (QoS) rule to a Serving Gateway (SGW) and receives at least one event message from the SGW.

14. The PCRN according to claim 9, wherein the data stored in the Event Storage comprises:
 a name of a PCC rule;
 a time of the event;
 an indication of a type of the event; and
 an affected network component.

15. A non-transitory machine-readable storage medium encoded with instructions for a Policy and Charging Rules Node (PCRN) to respond to a service request based at least partially on a status of a subscriber network, the non-transitory machine-readable storage medium comprising:
 instructions for receiving at the PCRN at least one event message related to a transfer facilitated by the subscriber network;
 instructions for storing data regarding the at least one event message in an Event Storage;
 instructions for receiving at the PCRN a service request for resources controlled by the PCRN;
 instructions for determining the status of the subscriber network;
 instructions for determining from the status of the subscriber network whether the service request should be fulfilled as requested; and
 instructions for generating at least one new policy and charging control (PCC) rule to fulfill the service request if the service request should be fulfilled as requested, wherein the instructions for determining the status of the subscriber network further comprise:
 instructions for identifying at least one statistical trend among a subset of the data in the Event Storage; and
 instructions for determining from the at least one statistical trend whether an element of the subscriber network is congested.

16. The non-transitory machine-readable storage medium of claim 15, further comprising:
 instructions for determining an acceptable service request if the service request should not be fulfilled as requested;
 instructions for negotiating with an Application Function over an Rx interface; and
 instructions for receiving a modified service request.

17. The non-transitory machine-readable storage medium according to claim 15, wherein the PCRN comprises a Network Topology and the instructions for determining a status of a subscriber network further comprise:
 instructions for identifying an element of the subscriber network that is congested using the Network Topology.

18. The non-transitory machine-readable storage medium according to claim 15, wherein the data regarding the at least one event message comprises:
 a name of a PCC rule;
 a time of the event;
 an indication of a type of the event; and
 an affected network component.

19. The non-transitory machine-readable storage medium according to claim 18, wherein the indication of a type of the event comprises at least one of:
 a failure to allocate a bearer; and
 a loss of bearer due to priority preemption.

20. The non-transitory machine-readable storage medium according to claim 15, wherein the instructions for determining the status of the subscriber network comprises:
 determining the status of the subscriber network based at least partially on PCC rules stored in a Rules Storage.

* * * * *